United States Patent [19]

Jones et al.

[11] Patent Number: 5,652,652
[45] Date of Patent: *Jul. 29, 1997

[54] METHOD AND APPARATUS FOR INHIBITING LASER DETECTION

[75] Inventors: Mark F. Jones; Henry Devilliers, both of San Antonio, Tex.

[73] Assignee: Laser Stealth Technologies, L.L.C., San Antonio, Tex.

[*] Notice: The term of this patent shall not extend beyond the expiration date of Pat. No. 5,491,547.

[21] Appl. No.: 600,412

[22] Filed: Feb. 12, 1996

Related U.S. Application Data

[63] Continuation-in-part of Ser. No. 253,806, Jun. 3, 1994, Pat. No. 5,491,547.

[51] Int. Cl.$^6$ ................... G09F 7/00; G01P 3/36
[52] U.S. Cl. .................. 356/28; 342/13; 40/202; 250/341.1
[58] Field of Search ................... 250/340, 342, 250/341.1; 342/1, 2, 13, 14; 359/350, 359, 326, 885; 356/28.5, 28; 40/202

[56] References Cited

U.S. PATENT DOCUMENTS

| | | | |
|---|---|---|---|
| 4,756,778 | 7/1988 | Deitz et al. | 149/108.2 |
| 5,024,923 | 6/1991 | Suzuki et al. | 430/372 |
| 5,134,296 | 7/1992 | Gravisse et al. | 250/458.1 |
| 5,271,872 | 12/1993 | Sallavanti et al. | 252/582 |
| 5,491,547 | 2/1996 | Jones et al. | 356/28 |
| 5,501,724 | 3/1996 | Loff | 106/10 |

OTHER PUBLICATIONS

Road and Track Magazine, Dec. 1992, p. 137.
Road and Track Magazine, Nov. 1993, p. 127.
Schrauzer et al. *Preparation, Reactions, and Structure of Bisdithio-α-diketone Complexes of Nickel, Palladium, and Platinum*, pp. 1483–1489, 1964.
Nakazumi et al. *Near-Infrared Absorbing Dyes*, 92:1197–1226:1992.

*Primary Examiner*—Mark Hellner

[57] ABSTRACT

Applicant's invention is a method and apparatus for inhibiting laser detection wherein the infrared laser light from a laser gun is absorbed, diffused, and dispersed, hindering the quick response needed for accurate laser readings. The laser detection inhibitor incorporates a rectangular thermoplastic lens panel and a filtering treatment which coats or is infused into the thermoplastic lens panel. The thermoplastic lens panel is suitably formed for placement over a vehicular license plate. The panel is adapted for placement over the license plate. After the panel is sprayed or infused during molding with the filtering treatment, the panel is affixed over the license plate using the existing attachment means for the vehicular license plate. Applicant's invention may also be placed in spray or film form over other reflective vehicular parts. Applicant's invention uniformly covers the license plate absorbing, diffusing, and dispersing infrared laser light and therefore, inhibiting laser detection.

18 Claims, 3 Drawing Sheets

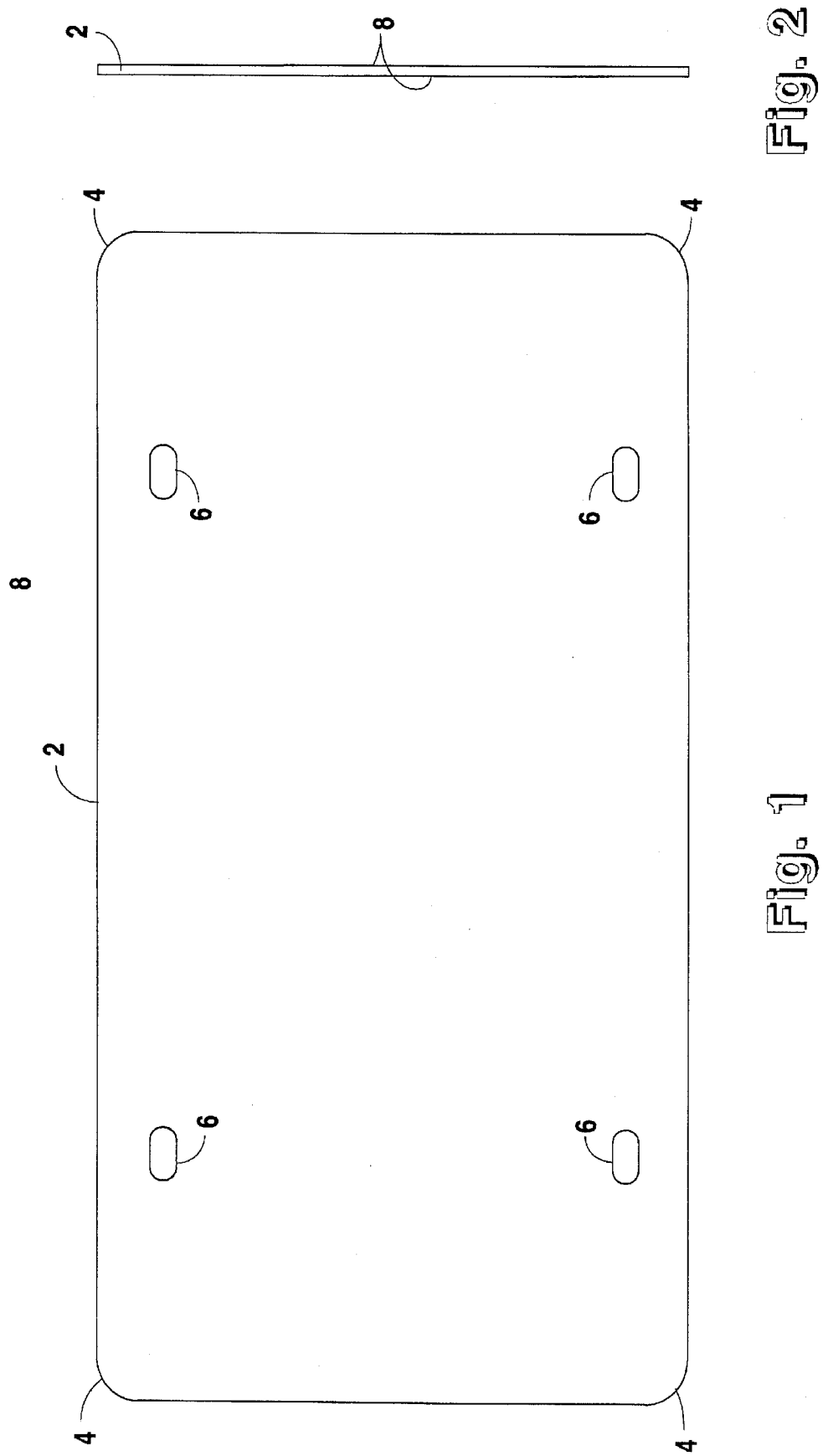

METHOD AND APPARATUS FOR INHIBITING LASER DETECTION

BACKGROUND OF THE INVENTION

This is a continuation-in-part of U.S. Ser. No. 08/253,806, filed Jun. 3, 1994, entitled METHOD AND APPARATUS FOR INHIBITING LASER DETECTION now U.S. Pat. No. 5,491,547.

1. Field of the Invention

This invention generally relates to laser stealth technology, more specifically to a thermoplastic lens panel coated or infused with a filtering treatment for the absorption, diffusion, and dispersion of infrared laser light.

2. Background Information

The speed detection industry has evolved significantly over the past several years, beginning with the conventional radar gun and countermeasure radar detector progressing to the newer laser gun and more recent laser detector.

In the current art, conventional radar guns use the "first car" theory. Radar's wide beam allows operation of the radar gun from a moving or stationary vehicle. Target identification, however, is normally limited to the first car. This conventional radar emits microwave signals, detectable beyond line of sight by radar detection devices. This phenomenon allows radar detection devices to be an adequate countermeasure.

With the advancement of technology, however, has come the use and development of laser technology for speed detection. Laser technology in speed detection incorporates the lidar gun which uses a narrow beam from a stationary position. Laser operates on the parallax theory of two straight lines. Target identification is possible through sighting the beam on any vehicle within the operator's line of sight.

Visible light begins at approximately 400 namometers and ends at approximately 700 namometers. The lidar gun emits a laser frequency in the near infrared wavelength, the most common center frequency being approximately 905 namometers. The laser gun emits a short pulse of IR energy in a circular, narrow beam which is pointed at a vehicle's license plate because of the license plate's reflective properties. The distance to a target is then measured approximately 400 times per second.

Laser detection devices alone provide little or no advance warning while used in a lead vehicle. Most laser detection units alert you to laser only at the moment after the lidar gun has locked onto the auto's speed. Furthermore, many laser detection units, when tested, remained mute when the auto was locked into through a lidar gun from the rear of the vehicle.

Because a laser gun must "see" its' returning pulses, there has been experimentation in reducing the reflectivity of the auto. To date, strides in such experimentation were made only at the expense of the vehicle's function and appearance.

This young market has also attracted laser jamming products which do not fit the guidelines of conventional marketing prerequisites. Although many of these products have been tested with some success, they are not recommended due to price, legality, and general inconvenience.

There has also been experimentation and testing of actions and devices related to "flooding" the laser guns with large doses of infrared light. Current devices mount on the exterior of the vehicle near the vehicle's license plate such that when the laser gun is fired at the plate, the beam is flooded with infrared light, inhibiting reflection of the laser beam. These devices have met with limited success, primarily because they lack the sturdiness needed for mounting the device on the exterior of the vehicle.

Testing has also included turning a vehicle's driving lights on high, decreasing the reflective properties of the automobile. With the driving and bright lights illuminated, there was a significant decrease in the range and therefore the effectiveness of the lidar gun. Occasionally, however, the lidar gun was successful in locking into a speed even though an extensive amount of light was directed toward the gun. This method of inhibiting laser detection is not highly recommended however due to safety factors as drivers would be inclined to blind other drivers with high levels of light.

As with use of the high beam, with a vehicle's driving lights on regular or standard beam, the reflective properties of the automobile were decreased. Again, however, the lidar gun was successful in locking into a speed.

The physics of the laser gun demands different type countermeasures than those traditionally used for the radar gun. Applicant's invention addresses the need for an effective laser gun countermeasure without the negative side effects mentioned above. Applicant's invention was designed to eliminate the reflectivity of the vehicle license plate, thus reducing laser speed gun range. This method, used with a detector acts as a guard against laser speed measurement. The ability of Applicant's laser inhibitor to challenge the range of the laser gun makes Applicant's invention a solid countermeasure.

SUMMARY OF THE INVENTION

The present invention encompasses a method and apparatus for inhibiting laser detection. Applicant's laser detection inhibitor comprises a rectangular thermoplastic lens panel which is cut from a larger thermoplastic sheet or molded from the chosen thermoplastic. A filtering treatment coats or is infused into the thermoplastic lens panel and in combination with the initial thermoplastic lens panel successfully absorbs, diffuses, and disperses infrared laser light. This, in turn, hinders the quick response needed for accurate laser readings producing an "uncooperative target." Applicant's method of inhibiting laser detection begins with forming a thermoplastic lens panel suitable for placement over a vehicular license plate. This thermoplastic lens panel is adapted for placement over a vehicular license plate and is coated, through spraying, or infused with a filtering treatment. After the thermoplastic lens panel is sprayed or infused with the filtering treatment, the panel is affixed over the vehicular license plate, the thermoplastic lens panel generally corresponding with the configuration of the license plate. Applicant's method of inhibiting laser detection also encompasses spraying the filtering treatment or applying a film containing the filtering treatment directly to a vehicular surface, including the vehicular license plate. Application of the filtering treatment directly to the vehicular surface, through spray or film, also allows absorption, diffusion, and dispersion of infrared laser light.

It is an object of Applicant's invention to provide a laser inhibitor which, by incorporating a thermoplastic lens panel having a filtering treatment, hinders the quick response needed for accurate readings from a laser gun.

It is an also an object of Applicant's invention to provide a laser inhibitor which, through placement against a vehicle's license plate, produces an uncooperative target for laser detection.

Another object of Applicant's invention is to provide a laser inhibitor which absorbs, diffuses, and disperses infrared laser light.

Another object of Applicant's invention is to provide a laser inhibitor which prevents adequate signal reflection back to a laser gun with only a minimal reduction in the visible spectrum.

A further object of Applicant's invention is to provide a laser inhibitor which is non-reflective.

Other purposes and advantages will become apparent from the following description in light of the attached drawings.

BRIEF DESCRIPTION OF THE DRAWINGS

FIG. 1 is a front view of the thermoplastic lens panel as shown coated or infused with a filtering treatment.

FIG. 2 is a side view of Applicant's laser plate as shown coated or infused with a filtering treatment.

DETAILED DESCRIPTION OF THE PREFERRED EMBODIMENT

Figure 4:
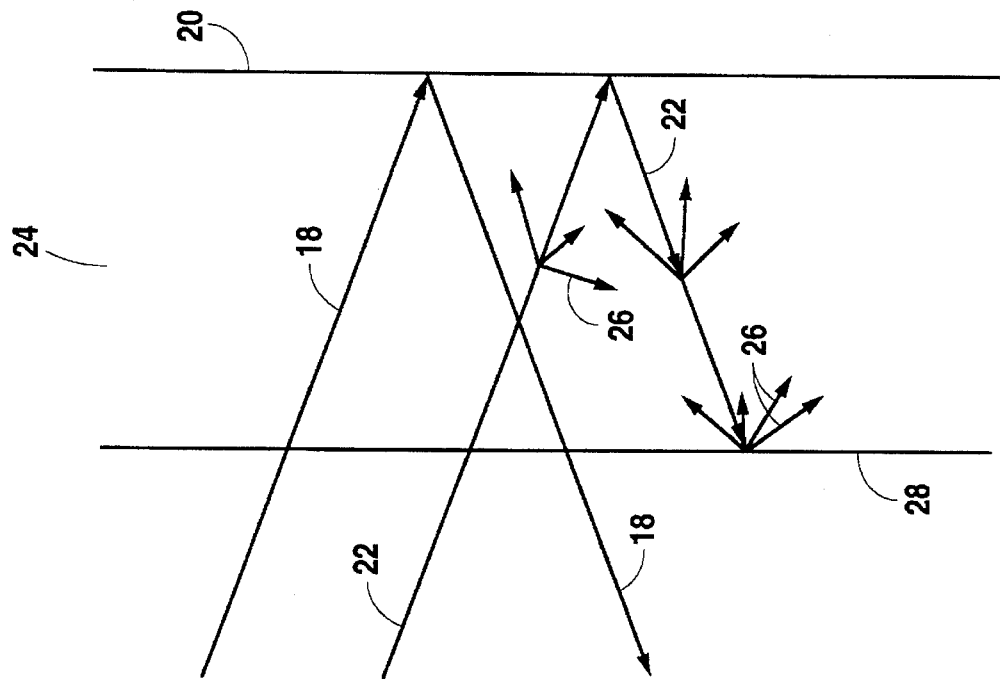
FIG. 4 illustrates the normal path of infrared light as well as the path of infrared light when subjected to Applicant's thermoplastic lens panel infused during molding with a filtering treatment, the infrared light being absorbed, dispersed, and diffused.

Referring to FIG. 1, Applicant's invention is shown in front view, the rear view being a mirror image of the front view as shown. A rectangular thermoplastic lens panel (2) has been cut from a larger thermoplastic sheet or has been formed through molding with thermoplastic. The rectangular thermoplastic lens panel (2) has four rounded corners (4) and four apertures (6). The rounded corners (4) and apertures allow the thermoplastic lens panel (2) to be placed over the vehicular license plate such that the thermoplastic lens panel (2) generally corresponds with the configuration of the vehicular license plate. The apertures (6) are appropriate for receiving the existing attachment means for the vehicular license plate, alleviating the need for a new attachment means. The thermoplastic lens panel (2) is a durable, flexible, clear material that is shatter resistant, lightweight, and suitable for exposure to exterior elements.

The thermoplastic lens panel (2) is coated or infused during molding with a filtering treatment (8) that absorbs, diffuses, and disperses infrared laser light. Therefore, reflection of laser light off of the auto's license plate is inhibited preventing an adequate signal analysis within the laser gun's system.

A laser beam generally possesses a circular, narrow beam configuration emission. The laser gun is typically pointed at the license plate of the vehicle due to the license plate's reflective factors. The filtering treatment (8) which coats or has been infused into the thermoplastic lens panel (2) inhibits a significant amount of this laser beam, preventing adequate reflection off of the license plate and ultimately an adequate signal analysis. The elements of the filtering treatment, discussed further below, also render the thermoplastic lens panel itself non-reflective.

Applicant's preferred embodiment for the thermoplastic lens panel is acrylic. The thermoplastic lens panel can also be made from a series of commonly used transparent thermoplastics including polystyrene (PS), polymethylmethacrylate (PMMA), polyvinylchloride (PVC), polycarbonate (PC), polyvinylbutyral (PVB), polyesters (PES), polyethylene (PE), polypropylene (PP), cellulose acetate (CA), and a number of co-polymer blends, such as polystyrene/divinylbenzene (PS/DVB), polymethylmethacrylate/ethylacrylate (PMMA/EA), and acrylonitrile/butadiene/styrene (ABS).

The preferred embodiment of the filtering treatment (8) for coating the thermoplastic lens panel through placing over or spraying consists of wood resins, matting agents, adhesive agents, and a lacquer base, and was originally designed for application over articles sensitive to ultra violet rays or halogen lights. This filtering treatment protects the article(s) from ultra violet rays emitted from the sun or commonly used halogen lights. Halogen lights emit approximately 40–50% of their radiation in infrared (above 700 namometers) wavelength spectrum. The preferred embodiment of the filtering treatment (8) when infused into the thermoplastic lens panel is a near-infrared absorbing dye CAS Reg. No. 21954-15-4. Other dyes include CAS Reg. No. 38951-97-2, CAS Reg. No. 30470-69-0 ($SbF_6^-$), and CAS Reg. No. 5496-71-9($2SbF_6^-$). CAS Reg. No. 21954-15-4 and CAS Reg. No. 38951-97-2 may use a Pt, Pd, or Ni central atom. These dyes are highly absorbing of near infrared light at or about 904 nanometers, have minimal absorbing of light within the visible range (400 nanometers–750 nanometers), and are compatible with injection molding and/or extrusion processes, and are low in cost and toxicity.

These filtering treatments also possess protective agents that perform and assist in protecting the article(s) from infrared light while allowing the observer to clearly view the article with the naked eye (commonly referred to as the visible spectrum). The same principle and concept is applied through Applicant's invention.

The thermoplastic lens panel (2) is completely coated or is infused during molding with the filtering treatment (8) for optimum performance. Although the filtering treatment (8) physically alters the surface or composition of the thermoplastic lens panel (2), Applicant's invention appears clear when placed close to a vehicular license plate such that the license plate can be easily seen. Applicant's invention effects both visible and infrared light as well as coherent and non-coherent light while still allowing the observer to view through the filtering treatment (8) with the naked eye.

When the naked eye observes an object, the eye makes use of visible light reflected off of an object to interpret that object. Applicant's invention, therefore, accomplishes the stated desired performance through inhibiting reflection of infrared light while still allowing enough visible light reflection to pass through the plate for the license plate to be easily viewed by the naked eye. Therefore, Applicant's invention may also be placed, particularly if in spray or film form, over other reflective vehicular parts as discussed more fully below.

Referring now to FIG. 2, Applicant's invention is shown in side view. Applicant's invention consists of the thermoplastic lens panel (2) and filtering treatment (8), the filtering treatment (8) either coating the thermoplastic lens panel (2) or infused during molding to form the thermoplastic lens panel (2), and for best performance is ⅛" in thickness.

Figure 3:
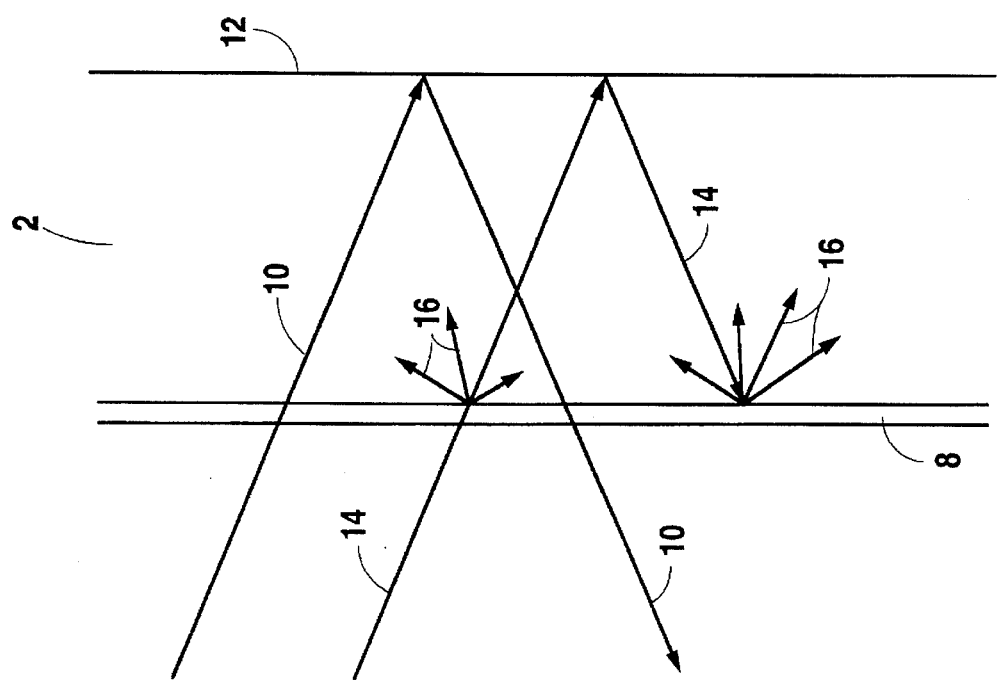
FIG. 3 illustrates the normal path of infrared light as well as the path of infrared light when subjected to Applicant's thermoplastic lens panel coated or sprayed with a filtering treatment, the infrared light being absorbed, dispersed, and diffused.

FIG. 3 illustrates the path of infrared light during normal reflection as well as when exposed to Applicant's thermoplastic lens panel coated with a filtering treatment. Path A

(10) illustrates the general path of infrared light as it reflects off a vehicular license plate (12). Path B (14), however, illustrates the path of infrared light when exposed to Applicant's laser detection inhibitor, particularly the filtering treatment (8) coating the thermoplastic lens panel (2). The filtering treatment (8) absorbs, diffuses, and disperses the infrared laser light (16). In addition, the filtering treatment physically alters the surface of the thermoplastic lens panel such that the surface of the thermoplastic lens panel is also non-reflective. Therefore, a significant amount of laser light is prevented from reflecting off the license plate (12) and returning to the laser unit for adequate signal analysis.

FIG. 4 illustrates the path of infrared light during normal reflection and when exposed to Applicant's thermoplastic lens panel infused with a filtering treatment during molding. Path C (18) as Path A (10) in FIG. 3, illustrates the general path of infrared light as it reflects off a vehicular license plate (20). Path D (22), however, illustrates the path of infrared light when exposed to Applicant's thermoplastic lens panel (28) infused with a filtering treatment (24) during molding. The filtering treatment (24) absorbs, diffuses, and disperses the infrared laser light (26) as the infrared light travels through the thermoplastic lens panel (28) to as well as away from the vehicular license plate (20). The filtering treatment, when infused into the thermoplastic used to mold the thermoplastic lens panel, alters the composition of the thermoplastic such that the surface of the thermoplastic lens panel (28) is non-reflective. As with Applicant's invention illustrated in FIG. 3, a significant amount of laser light is prevented from reflecting off the license plate (20) and returning to the laser unit for adequate signal analysis.

Figure 5:
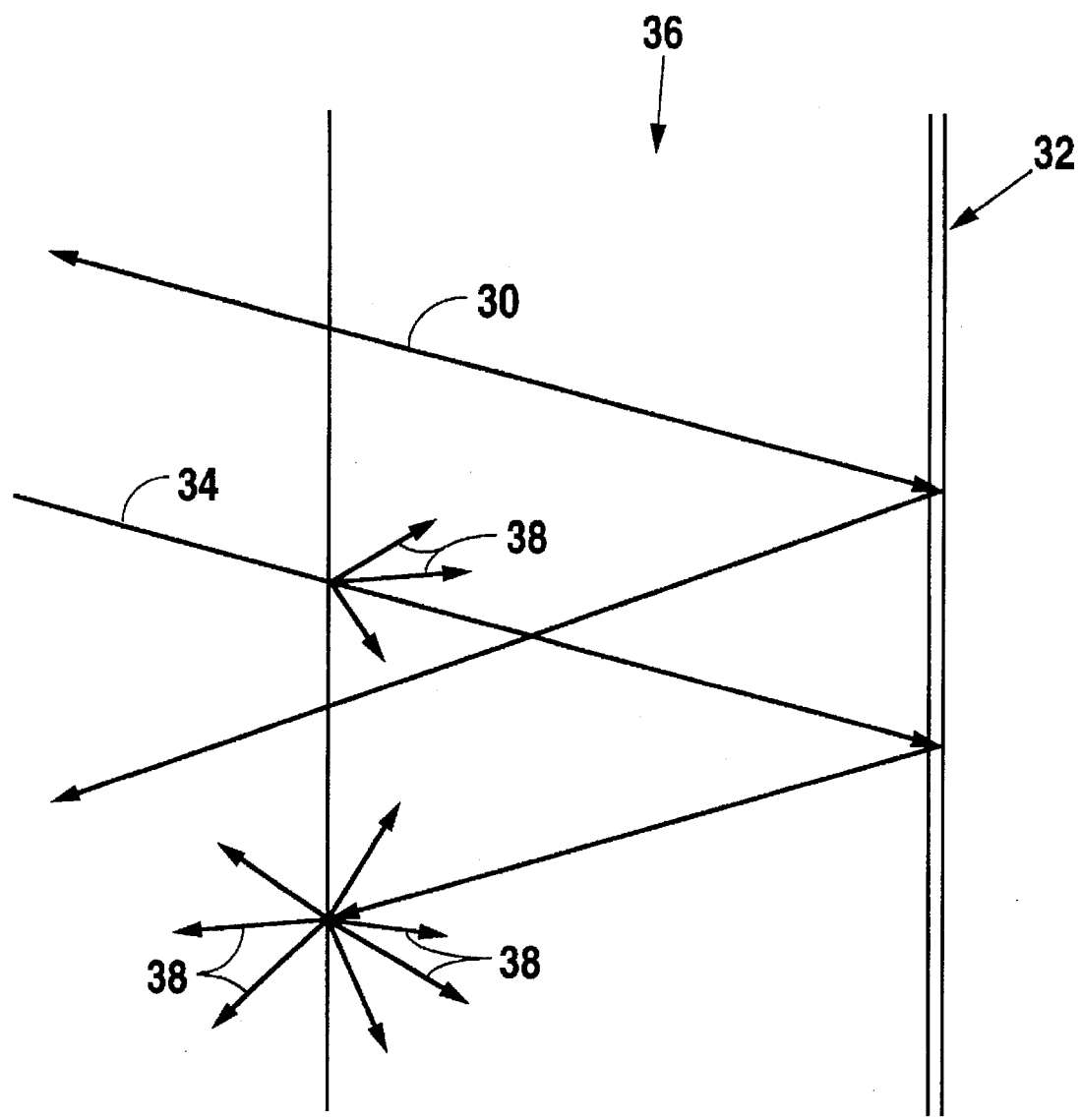
FIG. 5 illustrates the normal path of infrared light as well as the path of infrared light when subjected to Applicant's filtering treatment sprayed or applied through film directly to a vehicular surface.

FIG. 5 illustrates the path of infrared light during normal reflection and when exposed to Applicant's filtering treatment sprayed or applied through film directly to a vehicular surface. Path E (30) illustrates the general path of infrared light as it reflects off a vehicular surface (32). Path F (34), however, illustrates the path of infrared light when exposed to Applicant's filtering treatment (36) applied directly to vehicular surface (32). Path F (34) of infrared light is similar to Path B (14) in FIG. 3 although some variations will occur subject to the particular shape of vehicular surface (32). In any case, the filtering treatment (36) absorbs, diffuses, and disperses the infrared laser light (38). In addition, the filtering treatment physically alters the surface of the vehicular surface (32) such that the surface of the vehicular surface (32) is non-reflective. Regardless of the shape of vehicular surface (32), a significant amount of laser light is prevented from reflecting off the vehicular surface (32) and returning to the laser unit for adequate signal analysis.

If a laser beam returns with uniformity and without distortion of it's signal as shown in Path A (10), Path C (18), and Path E (30), performance of the laser gun is normally successful. Applicant's invention, however, disrupts the needed signal response thereby affecting the range of the laser unit. It follows that if a laser system normally detects a speed at 1500–1900 feet away, use of Applicant's invention will significantly reduce the response distance of the laser system for the same vehicle.

Applicant's method of inhibiting laser detection comprises the first step of forming or molding a rectangular lens panel. The thermoplastic lens panel, if formed from a larger thermoplastic sheet, is measured for placement over a vehicular license plate such that when cut into a rectangular form (having four corners), the thermoplastic lens panel generally corresponds with the configuration of the vehicular license plate. If the thermoplastic lens panel is molded from thermoplastic and a filtering treatment, the mold generally corresponds with the configuration of the vehicular license plate. The thermoplastic lens panel is then adapted for affixation to a vehicle's license plate through creating apertures appropriate for receiving the existing attachment means for the license plate and configuring the corners, if needed, to correspond with the configuration of the license plate.

The thermoplastic lens panel is coated, through spraying, with a filtering treatment provided the thermoplastic lens panel was not originally molded with the filtering treatment infused within the thermoplastic. The filtering treatment, if sprayed over the thermoplastic lens panel, physically alters the surface of the thermoplastic lens panel such that the surface of the thermoplastic lens panel is non-reflective. If the thermoplastic lens panel was originally molded from thermoplastic infused with the filtering treatment, the filtering treatment alters the composition of the thermoplastic lens panel such that the surface of the thermoplastic lens panel is non-reflective. Applicant's invention, including the thermoplastic lens panel and filtering treatment, is then affixed over a vehicle's license plate using the existing attachment means for the vehicular license plate. Applicant's invention uniformly covers the license plate absorbing, diffusing, and dispersing infrared laser light and therefore, inhibiting laser detection.

Applicant's method of inhibiting laser detection also comprises the steps of altering the light transmission properties of a vehicular surface by coating the vehicular surface with a filtering treatment. As with the filtering treatment (8) used for coating the thermoplastic lens panel, the filtering treatment (36) placed directly on the vehicular surface also consists of wood resins, matting agents, adhesives agents, and a lacquer base. Coating the vehicular surface is accomplished through spraying or applying a film containing the filtering treatment. The filtering treatment (36) which is applied inhibits a significant amount of a laser beam, preventing adequate reflection off of the vehicular surface and ultimately an adequate signal analysis.

In attempting to obtain an adequate signal analysis from a lidar gun, the laser beam is directed toward a reflective surface of the vehicle. Typically, the preferred reflective surface is the vehicle's license plate. It is becoming more common, however, to direct the laser beam at other reflective surfaces on the vehicle. Although use of the thermoplastic lens panel is ideal for inhibiting laser detection when the laser beam is directed at the vehicle's license plate, the lens panel is impractical for use in inhibiting laser detection on other surfaces of the vehicle. Therefore, the use of the filtering treatment in a spray or film form is suitable for all reflective surfaces on the vehicle, including the vehicle's license plate.

If applying the coating through use of a spray, the vehicular surface is sprayed with the filtering treatment. The application of the spray physically alters the surface of the vehicle's surface such that the surface is non-reflective.

If applying the coating through use of a film, the vehicular surface is coated with a film, resembling tape, which contains the filtering treatment. The film is applied directly to the vehicular surface, thereby physically altering the surface of the vehicle such that the surface is non-reflective.

Applicant's invention, whether in spray or film form, uniformly covers the vehicle's surface absorbing, defusing, and disbursing infrared light, and therefore, inhibiting laser detection.

What is claimed is:

1. Method of inhibiting laser detection comprising the steps of:
   a. altering light transmission properties of a thermoplastic lens panel, said thermoplastic lens panel suitable for placement over a vehicular license plate, wherein altering light transmission properties of said thermoplastic lens panel comprises the steps of:
      i. forming said thermoplastic lens panel;
      ii. adapting said thermoplastic lens panel for placement over said vehicular license plate;
      iii. coating said thermoplastic lens panel with a filtering treatment.

2. Method of inhibiting laser detection as recited in claim 1 wherein coating said thermoplastic lens panel with said filtering treatment comprises the steps of:
   a. spraying said thermoplastic lens panel with said filtering treatment wherein spraying said thermoplastic lens panel comprises physically altering the surface of said thermoplastic lens panel such that said surface of said thermoplastic lens panel is non-reflective.

3. Method of inhibiting laser detection as recited in claim 1 further comprising the step of:
   iv. affixing said thermoplastic lens panel over said vehicular license plate.

4. Method of inhibiting laser detection as recited in claim 3 wherein forming said thermoplastic lens panel comprises the steps of:
   a. measuring said thermoplastic lens panel for placement of said thermoplastic lens panel over said vehicular license plate; and
   b. cutting said thermoplastic lens panel into a rectangular form having four corners, said thermoplastic lens panel generally corresponding with a configuration of said vehicular license plate.

5. Method of inhibiting laser detection as recited in claim 3 wherein adapting said thermoplastic lens panel for affixation to said vehicular license plate comprises the steps of:
   a. creating apertures appropriate for receiving existing attachment means for said vehicular license plate; and
   b. configuring said corners of said thermoplastic lens panel to correspond with said configuration of said vehicular license plate.

6. Method of inhibiting laser detection as recited in claim 5 wherein affixing said thermoplastic lens panel to said vehicular license plate comprises the steps of:
   a. using said existing attachment means for said vehicular license plate to affix said thermoplastic lens panel over said vehicular license plate.

7. Method of inhibiting laser detection comprising the steps of:
   a. altering light transmission properties of a thermoplastic lens panel, said thermoplastic lens panel suitable for placement over a vehicular license plate, wherein altering light transmission properties of said thermoplastic lens panel comprises the step of:
      i. molding said thermoplastic lens panel comprising the step of infusing a filtering treatment into thermoplastic used to mold said thermoplastic lens panel wherein infusing said filtering treatment into said thermoplastic comprises physically altering the composition of said thermoplastic such that the surface of said thermoplastic lens panel is non-reflective.

8. Method of inhibiting laser detection as recited in claim 7, further comprising the steps of:
   ii. adapting said thermoplastic lens panel for placement over said vehicular license plate; and
   iii. affixing said thermoplastic lens panel over said vehicular license plate.

9. A laser detection inhibitor suitable for placement over a vehicular license plate, comprising:
   a. a rectangular thermoplastic lens panel, said thermoplastic lens panel having four corners; and
   b. a filtering treatment, said filtering treatment coating said rectangular thermoplastic lens panel wherein said filtering overlay treatment absorbs, disperses, and diffuses infrared laser light.

10. A laser detection inhibitor suitable for placement over a vehicular license plate, comprising:
    a. a rectangular thermoplastic lens panel, said thermoplastic lens panel having four corners; and
    b. a filtering treatment, said filtering treatment infused into thermoplastic used for said thermoplastic lens panel wherein said filtering treatment absorbs, disperses, and diffuses infrared laser light.

11. A laser detection inhibitor suitable for placement over a vehicular license plate as recited in claim 9, wherein:
    said rectangular thermoplastic lens panel includes at least one aperture, said aperture appropriate for receiving existing attachment means for said vehicular license plate.

12. A laser detection inhibitor suitable for placement over a vehicular license plate as recited in claim 10, wherein:
    said rectangular thermoplastic lens panel includes at least one aperture, said aperture appropriate for receiving existing attachment means for said vehicular license plate.

13. A laser detection inhibitor suitable for placement over a vehicular license plate as recited in claim 9, wherein:
    said rectangular thermoplastic lens panel includes four apertures, said apertures appropriate for receiving existing attachment means for said vehicular license plate.

14. A laser detection inhibitor suitable for placement over a vehicular license plate as recited in claim 10, wherein:
    said rectangular thermoplastic lens panel includes four apertures, said apertures appropriate for receiving existing attachment means for said vehicular license plate.

15. A laser detection inhibitor suitable for placement over a vehicular license plate as recited in claim 11, wherein:
    said corners of said rectangular thermoplastic lens panel are configured to correspond with a configuration of said vehicular license plate.

16. A laser detection inhibitor suitable for placement over a vehicular license plate as recited in claim 12, wherein:
    said corners of said rectangular thermoplastic lens panel are configured to correspond with a configuration of said vehicular license plate.

17. A laser detection inhibitor suitable for placement over a vehicular license plate as recited in claim 15, wherein:
    said filtering treatment physically alters the surface of said thermoplastic lens panel such that said surface of said thermoplastic lens panel is non-reflective.

18. A laser detection inhibitor suitable for placement over a vehicular license plate as recited in claim 16, wherein:
    said filtering treatment physically alters the composition of said thermoplastic used to mold said thermoplastic lens panel such that the surface of said thermoplastic lens panel is non-reflective.

* * * * *